(12) United States Patent
Ren et al.

(10) Patent No.: US 11,278,944 B2
(45) Date of Patent: Mar. 22, 2022

(54) NANOBIOREMEDIATION METHOD FOR SOIL IN HIGH-CONCENTRATION POLYCYCLIC AROMATIC HYDROCARBON (PAH)-CONTAMINATED SITE

(71) Applicant: Institute of Soil Science, Chinese Academy of Sciences, Jiangsu (CN)

(72) Inventors: Wenjie Ren, Jiangsu (CN); Ying Teng, Jiangsu (CN); Huimin Wang, Jiangsu (CN)

(73) Assignee: INSTITUTE OF SOIL SCIENCE, CHINESE ACADEMY OF SCIENCES, Jiangsu (CN)

( * ) Notice: Subject to any disclaimer, the term of this patent is extended or adjusted under 35 U.S.C. 154(b) by 0 days.

(21) Appl. No.: 17/035,893

(22) Filed: Sep. 29, 2020

(65) Prior Publication Data
US 2021/0178440 A1   Jun. 17, 2021

(30) Foreign Application Priority Data
Dec. 17, 2019   (CN) .......................... 201911305190.7

(51) Int. Cl.
*B09C 1/08* (2006.01)
*A01G 22/20* (2018.01)
*A01C 21/00* (2006.01)
*A01D 91/04* (2006.01)

(52) U.S. Cl.
CPC ................ *B09C 1/08* (2013.01); *A01C 21/00* (2013.01); *A01D 91/04* (2013.01); *A01G 22/20* (2018.02); *B09C 2101/00* (2013.01)

(58) Field of Classification Search
CPC ....... B09C 1/08; B09C 2101/00; B09C 1/105; A01G 22/20; A01C 21/00; A01D 91/04
See application file for complete search history.

(56) References Cited

U.S. PATENT DOCUMENTS

2020/0102498 A1*  4/2020  Bozkurt .................. B01J 20/12

FOREIGN PATENT DOCUMENTS

| CN | 1792483   | * | 6/2006  |
| CN | 103894157 | * | 7/2014  |
| CN | 105537255 | * | 5/2016  |
| CN | 108213064 | * | 6/2018  |
| CN | 108637005 | * | 10/2018 |
| CN | 109821891 | * | 5/2019  |

* cited by examiner

Primary Examiner — Carib A Oquendo
(74) Attorney, Agent, or Firm — Allen, Dyer, Doppelt + Gilchrist, PA

(57) ABSTRACT

A nanobioremediation method is for soil in a high-concentration polycyclic aromatic hydrocarbon (PAH)-contaminated site. The method includes adding a carbon nanomaterial and a base fertilizer to soil in a high-concentration PAH-contaminated site, evenly broadcast sowing alfalfa seeds to the contaminated soil, and keeping the soil moisture content at 60% of the field moisture capacity, and when the alfalfa grows to the flowering or maturity stage, harvesting and removing the plants from the contaminated soil.

5 Claims, 2 Drawing Sheets

NANOBIOREMEDIATION METHOD FOR SOIL IN HIGH-CONCENTRATION POLYCYCLIC AROMATIC HYDROCARBON (PAH)-CONTAMINATED SITE

TECHNICAL FIELD

The present invention relates to the development and application of nanotechnology in the field of remediation of contaminated soil, and particularly relates to a nanobioremediation method for soil in a high-concentration polycyclic aromatic hydrocarbon (PAH)-contaminated site.

BACKGROUND

Polycyclic aromatic hydrocarbons (PAHs) are a type of persistent organic pollutants composed of two or more benzene rings, and are common in the environment. Due to the carcinogenic, teratogenic and mutagenic effects, PAHs have been listed as priority pollutants by the United States, the European Union, etc. In addition, seven kinds of PAHs including benzo[a]pyrene and the like have also been included in the "Chinese environmental priority pollutants blacklist". In recent years, with the rapid development of industrialization and urbanization in China, PAHs have gradually accumulated in the soil. As shown in the Official Journal of National Survey on Soil Pollution released jointly by the Ministry of Environmental Protection and the Ministry of Land and Resources of the People's Republic of China in 2014, the points in PAH-contaminated soil exhibit an over-limit ratio of 1.4%, with points in the heavily-polluted soil accounting for 0.2%. PAHs are mainly accumulated in the heavily-polluted enterprise land, industrial wasteland, chemical industry park, oil-producing area, and sewage irrigation area and surrounding soil, and the PAH pollution in soil of these sites is characterized by complex types, high pollution concentration, wide pollution range or the like, thereby posing a great threat to the health of soil ecosystems and the safety of human settlements. In addition, for the development and reutilization of these lands, the government or land owners must conduct risk assessment and remediation for soil in the contaminated sites, and it usually needs to achieve the remediation target value within a short time. Therefore, it has become an urgent and important environmental science and technology problem in China to develop an efficient, low-cost, environment-friendly and sustainable soil remediation technology for soil in a high concentration PAH-contaminated site.

The current remediation techniques for PAH-contaminated soil mainly include washing remediation, chemical oxidation remediation, thermal desorption remediation, biological remediation or the like. However, the above techniques all have limited application scopes and some defects, and thus need to be further improved. For example, the washing remediation will produce a large amount of washing wastewater for organic contamination, requires complicated technical operations, has high requirements on the equipment, and tends to cause secondary pollution (Sun et al., 2013); the chemical oxidation technique will increase the base ion content in soil as a lot of oxidant is added to the soil, which changes the physical and chemical properties of the soil itself and causes the soil to have decreased permeability and texture (Tsitonaki et al., 2010); the thermal desorption remediation technique has high requirements on the equipment, high remediation cost, and long remediation period (Chen, 2004); and the biological remediation mainly includes plant remediation and microbial remediation, and such techniques have advantages, such as simple and convenient operations, low remediation cost, environmental protection and no secondary pollution, and thus demonstrate promising research and application prospects in the field of remediation for the organic-contaminated soil. For example, as described in Chinese patent 201010547623.2, the degradation of PAHs in soil is achieved by adding biosurfactant (rhamnolipid) to the soil, planting alfalfa in the soil and inoculating a bacterial agent comprised of arbuscular mycorrhizal, Bacillus and the like in the soil; and as reported in Chinese patent 201610438092.0, a bacterial agent formulated by chitosan, zeolite powder and the like can effectively degrade or adsorb PAHs in the soil. However, with low removal efficiency and long remediation period, the current bioremediation technology is only suitable for the remediation of soil in a low-concentration PAH-contaminated farmland, but not suitable for the rapid and environment-friendly remediation of soil in a high-concentration PAH-contaminated site.

Nanomaterials are a class of materials that have basic units sized within the nanoscale range (1 nm to 100 nm) in at least one dimension of the three-dimensional space or are composed of such basic units. Nanotechnology has been listed by many countries as an important area among top priorities for research and development in the 21st century (Xiao et al., 2009). The nanomaterial shows huge application potential in many fields such as environment and agriculture due to its unique characteristics such as surface/interface effect, small size effect and quantum size effect (Adeleye et al., 2016; Prasad et al., 2017). Studies have shown that carbon nanomaterials are widely used as adsorption materials for organic pollutants and heavy metal ions in sewage treatment (Santhosh et al., 2016), and magnetic carbon nanomaterials can achieve the adsorption and removal of PAHs and antibiotics in water environments (Shi, 2013), but there are few reports on the application of carbon nanomaterials in the field of remediation for contaminated soil. Some carbon nanomaterials can promote the germination and growth of plants, enhance the stress resistance of plants (Ren et al., 2016), and change the microbial community structure in soil, but there is no report about the application of carbon nanomaterials in the bioremediation of high-concentration PAH-contaminated soil.

SUMMARY

Technical problem to be solved: Facing the high demand for soil remediation in high-concentration PAH-contaminated sites, the present invention provides a nanobioremediation method for soil in a high-concentration PAH-contaminated site in view of the above-mentioned deficiencies of the prior art, which can overcome disadvantages of the bioremediation technology, such as low removal efficiency and long remediation period, and thereby can achieve efficient, environment-friendly, economical and sustainable remediation for contaminated soil in a site.

Technical solution: The present invention provides a nanobioremediation method for soil in a high-concentration PAH-contaminated site, including the following steps: adding a carbon nanomaterial and a base fertilizer to soil in a high-concentration PAH-contaminated site; evenly broadcast sowing alfalfa seeds to the contaminated soil, and watering regularly to keep the soil moisture content at 60% of the field moisture capacity; and when the alfalfa grows to the flowering or maturity stage, harvesting and removing the plants from the contaminated soil.

Preferably, the carbon nanomaterial is at least one of single-walled carbon nanotube (SWCNT), multi-walled carbon nanotube (MWCNT) or sulfonated graphene.

Preferably, the carbon nanomaterial is added as follows: the SWCNT is added at an amount of 0.05 mg/g, the MWCNT is added at an amount of 0.05 mg/g, and the sulfonated graphene is added at an amount of 0.2 mg/g.

Preferably, the base fertilizer is urea, $Ca(H_2PO_4)_2 \cdot H_2O$ and $K_2SO_4$.

Preferably, the base fertilizer is added at an amount as follows: 0.215 g of urea, 0.285 g of $Ca(H_2PO_4)_2 \cdot H_2O$ and 0.188 g of $K_2SO_4$ per kilogram of soil.

Beneficial effects: (1) By adding carbon nanomaterials to contaminated soil, the present invention enhances the ability of alfalfa rhizosphere to degrade PAHs, improves the remediation efficiency and shortens the remediation period, which can reduce the high PAH concentration in soil of a site to a value below the risk screening value within 60 to 90 days. (2) The present invention, which is based on the remediation principle that carbon nanomaterials strengthen the degradation of PAHs by alfalfa rhizosphere, has more environmental significance and practical value. The high-concentration PAH-contaminated soil comes from a contaminated site of a coking plant, and there are about 12 types of PAHs, including: fluorene (1.68 mg/kg), phenanthrene (34.13 mg/kg), anthracene (1.88 mg/kg), fluoranthene (61.51 mg/kg), pyrene (89.99 mg/kg), benzo[a]anthracene (29.82 mg/kg), chrysene (23.44 mg/kg), benzo[b]fluoranthene (25.86 mg/kg), benzo[k]fluoranthene (13.64 mg/kg), benzo[a]pyrene (33.32 mg/kg), dibenzo[a,h]anthracene (2.12 mg/kg) and benzo[g,h,i]pyrene (27.09 mg/kg), with a total PAH concentration of 344.48 mg/kg. The conditions are similar to the actual conditions for soil. (3) The method of the present invention has little impact on the soil environment with a low amount of carbon nanomaterials being used. The method, compared with a traditional physical and chemical remediation technology, has advantages, such as low cost, no secondary pollution during the remediation process and small disturbance to soil; and compared with the remediation by plants alone, has advantages, such as significantly-improved remediation effect and shortened remediation period. (4) With simple operations, small disturbance to environment, low economic cost and high remediation efficiency, the present invention is suitable for the remediation of various PAH-contaminated sites.

DETAILED DESCRIPTION

The present invention will be further described below by way of examples, so as to clarify the outstanding features and significant progress of the present invention, which is merely to illustrate the present invention and is not limited to the following examples. The method of the present invention is adopted to remediate soil in a high-concentration PAH-contaminated site.

Figure 1:
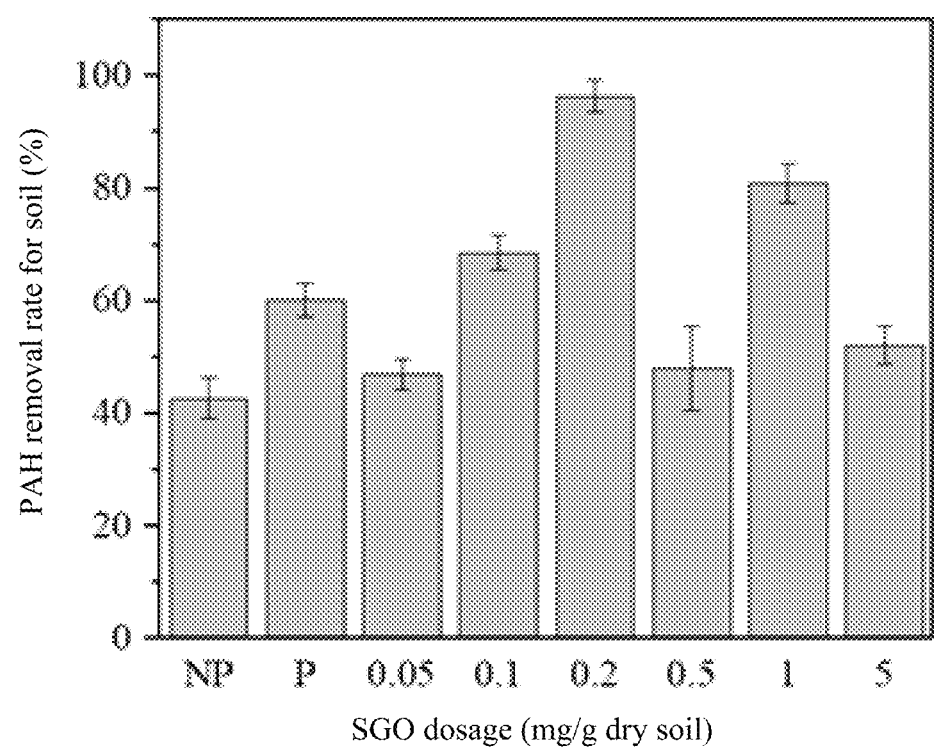
FIG. 1 is a diagram showing the effect of the dosage of sulfonated graphene on the PAH removal rate during the remediation of contaminated soil by alfalfa.

Example 1: Enhancing Effect of Sulfonated Graphene Added at Different Dosages on the Removal of PAHs in Soil by Alfalfa The soil collected from a contaminated site of a coking plant in Nanjing was adopted as test soil for an indoor pot experiment. The collected soil was air-dried, then gravel and animal and plant residues therein were removed, and the resulting soil was sieved through a 4 mm sieve and mixed thoroughly. The PAH content in the soil was 344.48 mg/kg. 0.6 kg of soil was used for a pot, with 0.215 g of urea, 0.285 g of $Ca(H_2PO_4)_2 \cdot H_2O$ and 0.188 g of $K_2SO_4$ per kilogram of soil. Sulfonated graphene was added to the soil, and different dosage levels (0.05, 0.1, 0.2, 0.5, 1.0 and 5.0 mg/g) were set, with 3 replicates for each dosage. The following method was adopted for the pregermination of alfalfa seeds: the alfalfa seeds were soaked in a 0.5% sodium hypochlorite solution for 10 min of surface sterilization, and then cleaned; the obtained alfalfa seeds were placed in a 95% alcohol solution for 10 min of surface sterilization, rinsed 5 times with sterile water, and then soaked in sterile water in a beaker for 2 h; and the soaked seeds were evenly placed in a sterile petri dish covered with a moist filter paper, and subjected to pregermination at 28° C. in the dark for 24 h. After the seeds had germinated, plump seeds with a fixed size were selected and spread evenly in the contaminated soil. 40 seeds were spread evenly in each pot, and after seedlings emerged, 30 seedlings with the same growth trend were selected and reserved. The potted plants were cultivated in a light cultivation room, with a temperature of about 26° C. during the day and a temperature of about 20° C. at night. The plants were watered regularly every day with deionized water to keep the soil moisture content at about 60% of the field moisture capacity. After alfalfa grew for 60 days, soil and plant samples were collected separately. The soil samples were lyophilized, ground, and sieved through a 100-mesh sieve, and the content of PAHs in the soil was determined by extraction. Moreover, a blank control without alfalfa being planted and a treatment group with alfalfa being planted alone were set up. In the blank control without alfalfa being planted, no sulfonated graphene was added, no alfalfa was planted, and the other conditions were the same as above. In the treatment group with alfalfa being planted alone, alfalfa was planted, but no sulfonated graphene was added, and the other conditions were the same as above. FIG. 1 shows the effect of the dosage of sulfonated graphene on the PAH removal rate during the remediation of contaminated soil by alfalfa.

As shown in FIG. 1, when sulfonated graphene is added at a relatively-low dosage, the PAH removal rate for the soil by alfalfa increases with increasing dosage of sulfonated graphene; when sulfonated graphene is added at 0.2 mg/g, alfalfa exhibits a maximum PAH removal rate for the soil, reaching 96.43%, which is much higher than that of the blank control without alfalfa being planted (42.71%) and the treatment group with alfalfa being planted alone (60.15%), indicating that sulfonated graphene exhibits an efficient enhancement effect on the PAH degradation by alfalfa rhizosphere; but as the dosage of sulfonated graphene is further increased, the PAH removal rate for the soil decreases, indicating that sulfonated graphene has an optimal dosage of 0.2 mg/g.

Table 1 shows the residual concentration of each component of PAHs in soil after the soil is remediated for 60 days by adding sulfonated graphene at 0.2 mg/g and planting alfalfa. It can be seen from the table that after remediation, the residual concentration of each component of PAHs in the soil is tremendously lower than the initial concentration, and are all below the contamination risk screening value for soil in construction land (first-class land), meeting the most stringent requirements for the redevelopment and reutilization of construction land; and in the blank control without alfalfa being planted and the treatment group with alfalfa being planted alone, the residual concentration of each component of PAHs is still relatively high, and most still far exceed the contamination risk screening value for soil in construction land (first-class land).

Figure 2:
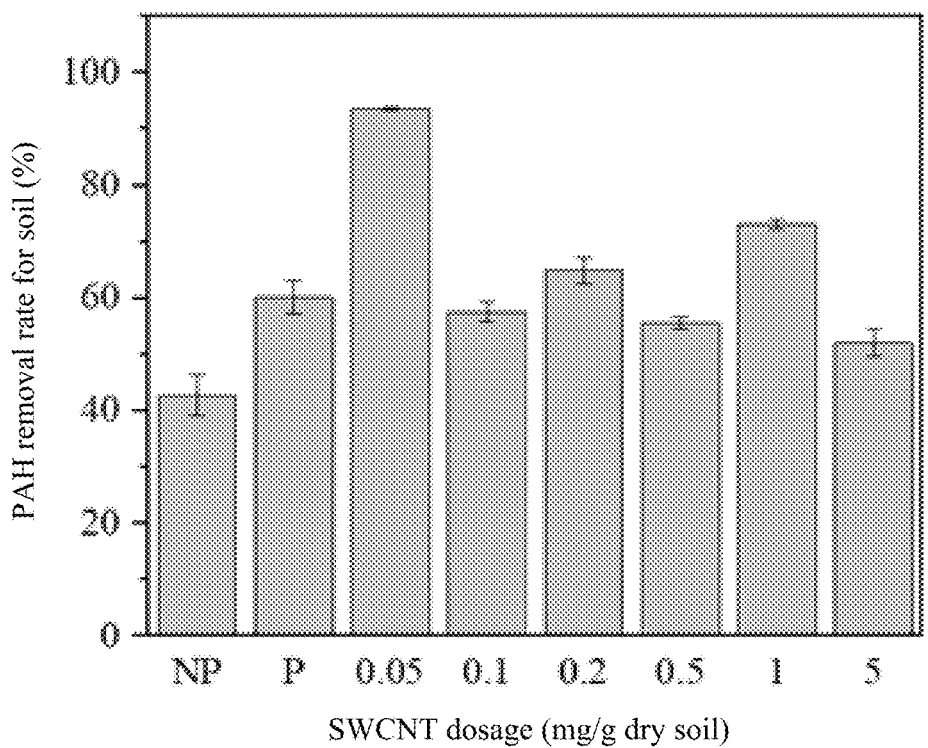
FIG. 2 is a diagram showing the effect of the dosage of SWCNT on the PAH removal rate during the remediation of contaminated soil by alfalfa.

Example 2: Enhancing Effect of SWCNT Added at Different Dosages on the Removal of PAHs in Soil by Alfalfa The soil collected from a contaminated site of a coking plant in Nanjing was adopted as test soil for an indoor pot experiment. The collected soil was air-dried, then gravel and animal and plant residues therein were removed, and the resulting soil was sieved through a 4 mm sieve and mixed thoroughly. The PAH content in the soil was 344.48 mg/kg. 0.6 kg of soil was used for a pot, with 0.215 g of urea, 0.285 g of $Ca(H_2PO_4)_2 \cdot H_2O$ and 0.188 g of $K_2SO_4$ per kilogram of soil. SWCNT was added to the soil, and different dosage levels (0.05, 0.1, 0.2, 0.5, 1.0 and 5.0 mg/g) were set, with 3 replicates for each dosage. The following method was adopted for the forced germination of alfalfa seeds: the alfalfa seeds were soaked in a 0.5% sodium hypochlorite solution for 10 min of surface sterilization, and then cleaned; the obtained alfalfa seeds were placed in a 95% alcohol solution for 10 min of surface sterilization, rinsed 5 times with sterile water, and then soaked in sterile water in a beaker for 2 h; and the soaked seeds were evenly placed in a sterile petri dish covered with a moist filter paper, and subjected to forced germination at 28° C. in the dark for 24 h. After the seeds had germinated, plump seeds with a fixed size were selected and spread evenly in the contaminated soil. 40 seeds were spread evenly in each pot, and after seedlings emerged, 30 seedlings with the same growth trend were selected and reserved. The potted plants were cultivated in a light cultivation room, with a temperature of about 26° C. during the day and a temperature of about 20° C. at night. The plants were watered regularly every day with deionized water to keep the soil moisture content at about 60% of the field moisture capacity. After alfalfa grew for 60 days, soil and plant samples were collected separately. The soil samples were lyophilized, ground, and sieved through a 100-mesh sieve, and the content of PAHs in the soil was determined by extraction. Moreover, a blank control without alfalfa being planted and a control group with alfalfa being planted alone were set up. In the blank control without alfalfa being planted, no SWCNT was added, no alfalfa was planted, and the other conditions were the same as above. In the treatment group with alfalfa being planted alone, alfalfa was planted, but no SWCNT was added, and the other conditions were the same as above. FIG. 2 shows the effect of the dosage of SWCNT on the PAH removal rate during the remediation of contaminated soil by alfalfa.

As shown in FIG. 2, when SWCNT is added at 0.05 mg/g, alfalfa exhibits a maximum PAH removal rate for the soil, reaching 93.64%, which is much higher than that of the blank control without alfalfa being planted (42.71%) and the treatment group with alfalfa being planted alone (60.15%), indicating that SWCNT exhibits an efficient enhancement effect on the PAH degradation by alfalfa rhizosphere; as the dosage of SWCNT is increased, the PAH removal rate for the soil has no significant difference with that of the treatment group with alfalfa being planted alone; only when the dosage of SWCNT is increased to 1 mg/g, the PAH removal rate for the soil is increased by 13% compared with the treatment group with alfalfa being planted alone, but still significantly lower than that at the dosage of 0.05 mg/g, indicating that SWCNT has an optimal dosage of 0.05 mg/g.

Table 2 shows the residual concentration of each component of PAHs in soil after the soil is remediated for 60 days by adding SWCNT at 0.05 mg/g and planting alfalfa. It can be seen from the table that after remediation, the residual concentration of each component of PAHs in the soil is tremendously lower than the initial concentration, and except for benzo[a]pyrene, the other components all have a residual concentration below the contamination risk screening value for soil in construction land (first-class land), but benzo[a]pyrene also has a residual concentration lower than the risk control value for the first-class land; as alfalfa further grows, the concentration of benzo[a]pyrene will continue to decrease; and in the blank control without alfalfa being planted and the treatment group with alfalfa being planted alone, the residual concentration of each component of PAHs is still relatively high, and most still far exceed the contamination risk screening value for soil in construction land (first-class land).

Figure 3:
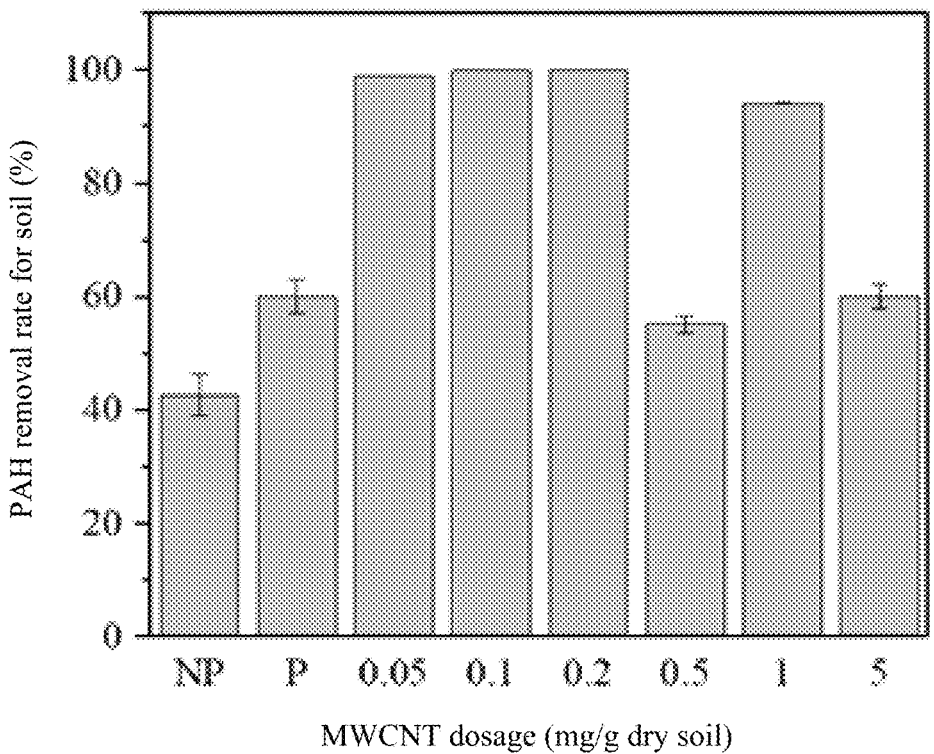
FIG. 3 is a diagram showing the effect of the dosage of MWCNT on the PAH removal rate during the remediation of contaminated soil by alfalfa.

Example 3: Enhancing Effect of MWCNT Added at Different Dosages on the Removal of PAHs in Soil by Alfalfa The soil collected from a contaminated site of a coking plant in Nanjing was adopted as test soil for an indoor pot experiment. The collected soil was air-dried, then gravel and animal and plant residues therein were removed, and the resulting soil was sieved through a 4 mm sieve and mixed thoroughly. The PAH content in the soil was 344.48 mg/kg. 0.6 kg of soil was used for a pot, with 0.215 g of urea, 0.285 g of $Ca(H_2PO_4)_2 \cdot H_2O$ and 0.188 g of $K_2SO_4$ per kilogram of soil. MWCNT was added to the soil, and different dosage levels (0.05, 0.1, 0.2, 0.5, 1.0 and 5.0 mg/g) were set, with 3 replicates for each dosage. The following method was adopted for the forced germination of alfalfa seeds: the alfalfa seeds were soaked in a 0.5% sodium hypochlorite solution for 10 min of surface sterilization, and then cleaned; the obtained alfalfa seeds were placed in a 95% alcohol solution for 10 min of surface sterilization, rinsed 5 times with sterile water, and then soaked in sterile water in a beaker for 2 h; and the soaked seeds were evenly placed in a sterile petri dish covered with a moist filter paper, and subjected to forced germination at 28° C. in the dark for 24 h. After the seeds had germinated, plump seeds with a fixed size were selected and spread evenly in the contaminated soil. 40 seeds were spread evenly in each pot, and after seedlings emerged, 30 seedlings with the same growth trend were selected and reserved. The potted plants were cultivated in a light cultivation room, with a temperature of about 26° C. during the day and a temperature of about 20° C. at night. The plants were watered regularly every day with deionized water to keep the soil moisture content at about 60% of the field moisture capacity. After alfalfa grew for 60 days, soil and plant samples were collected separately. The soil samples were lyophilized, ground, and sieved through a 100-mesh sieve, and the content of PAHs in the soil was determined by extraction. Moreover, a blank control without alfalfa being planted and a control group with alfalfa being planted alone were set up. In the blank control without alfalfa being planted, no MWCNT was added, no alfalfa was planted, and the other conditions were the same as above. In the treatment group with alfalfa being planted alone, alfalfa was planted, but no MWCNT was added, and the other conditions were the same as above. FIG. 3 shows the effect of the dosage of MWCNT on the PAH removal rate during the remediation of contaminated soil by alfalfa.

As shown in FIG. 3, when MWCNT is added at 0.05 mg/g to 0.2 mg/g, alfalfa exhibits a PAH removal rate of 99.05% to 99.98% for the soil, which is significantly higher than that of the treatment group with alfalfa being planted alone (60.15%) and much higher than that of the blank control without alfalfa being planted (42.71%), indicating that MWCNT exhibits an efficient enhancement effect on the PAH degradation by alfalfa rhizosphere; as the dosage of MWCNT is increased, the PAH removal rate for the soil has no significant difference with that of the treatment group with alfalfa being planted alone; but when the dosage of MWCNT is increased to 1 mg/g, the PAH removal rate for the soil is increased by 34% compared with the treatment group with alfalfa being planted alone; and given a comprehensive consideration including the MWCNT cost, it can be determined that MWCNT has an optimal dosage of 0.05 mg/g.

Table 3 shows the residual concentration of each component of PAHs in soil after the soil is remediated for 60 days by adding MWCNT at 0.05 mg/g and planting alfalfa. It can be seen from the table that after remediation, the residual concentration of each component of PAHs in the soil is tremendously lower than the initial concentration, and are all below the contamination risk screening value for soil in construction land (first-class land), meeting the most stringent requirements for the redevelopment and reutilization of construction land; and in the blank control without alfalfa being planted and the treatment group with alfalfa being planted alone, the residual concentration of each component of PAHs is still relatively high, and most still far exceed the contamination risk screening value for soil in construction land (first-class land).

TABLE 1

Enhancing effect of sulfonated graphene (SG) added at 0.2 mg/g on the removal of PAHs in soil by alfalfa

| Treatment | Fluorene | Phenanthrene | Anthracene | Fluoranthene | Pyrene | Benzo[a]anthracene | Chrysene | Benzo[b]fluoranthene | Benzo[k]fluoranthene | Benzo[a]pyrene | Dibenzo[a, h]anthracene | Benzo[g, h, i]pyrene | Total PAHs |
|---|---|---|---|---|---|---|---|---|---|---|---|---|---|
| Initial concentration in soil | 1.68 | 34.13 | 1.88 | 61.51 | 89.99 | 29.82 | 23.44 | 25.86 | 13.64 | 33.32 | 2.12 | 27.09 | 344.48 |
| The control with no plants | 0.28 | 14.23 | 0.45 | 33.14 | 57.28 | 18.14 | 14.66 | 14.37 | 7.22 | 21.42 | 0.98 | 15.17 | 197.34 |
| Planting alfalfa alone | 0.15 | 12.91 | 0.26 | 21.93 | 41.44 | 12.96 | 7.82 | 9.86 | 4.23 | 15.36 | 0.33 | 10.05 | 137.28 |
| Adding SG (0.2 mg/g) + planting alfalfa | 0.04 | 0.72 | 0.15 | 2.52 | 3.36 | 0.85 | 0.67 | 2.05 | 0.44 | 0.47 | 0.41 | 0.77 | 12.31 |
| Contamination risk screening value for soil in construction land (first-class land) | | | | | | 5.5 | 490 | 5.5 | 55 | 0.55 | 0.55 | | |

TABLE 2

Enhancing effect of SWCNT added at 0.05 mg/g on the removal of PAHs in soil by alfalfa

| Treatment | Fluorene | Phenanthrene | Anthracene | Fluoranthene | Pyrene | Benzo[a]anthracene | Chrysene | Benzo[b]fluoranthene | Benzo[k]fluoranthene | Benzo[a]pyrene | Dibenzo[a, h]anthracene | Benzo[g, h, i]pyrene | Total PAHs |
|---|---|---|---|---|---|---|---|---|---|---|---|---|---|
| Initial concentration in soil | 1.68 | 34.13 | 1.88 | 61.51 | 89.99 | 29.82 | 23.44 | 25.86 | 13.64 | 33.32 | 2.12 | 27.09 | 344.48 |
| The control with no plants | 0.28 | 14.23 | 0.45 | 33.14 | 57.28 | 18.14 | 14.66 | 14.37 | 7.22 | 21.42 | 0.98 | 15.17 | 197.34 |
| Planting alfalfa alone | 0.15 | 12.91 | 0.26 | 21.93 | 41.44 | 12.96 | 7.82 | 9.86 | 4.23 | 15.36 | 0.33 | 10.05 | 137.28 |
| Adding SWCNT (0.05 mg/g) + planting alfalfa | 0.10 | 1.92 | 0.19 | 4.58 | 5.61 | 1.99 | 1.65 | 2.10 | 0.99 | 1.98 | 0.12 | 1.26 | 22.50 |

TABLE 2-continued

Enhancing effect of SWCNT added at 0.05 mg/g on the removal of PAHs in soil by alfalfa

| Treatment | Fluorene | Phenan-threne | Anthra-cene | Fluoran-thene | Pyrene | Benzo[a] anthracene | Chrysene | Benzo [b] fluoran-thene | Benzo [k] fluoran-thene | Benzo [a] pyrene | Dibenzo [a, h] anthra-cene | Benzo [g, h, i] pyrene | Total PAHs |
|---|---|---|---|---|---|---|---|---|---|---|---|---|---|
| Contamination risk screening value for soil in construction land (first-class land) | | | | | | 5.5 | 490 | 5.5 | 55 | 0.55 | 0.55 | | |

TABLE 3

Enhancement effect of MWCNT added at 0.05 mg/g on the removal of PAHs in soil by alfalfa

| Treatment | Fluorene | Phenan-threne | Anthra-cene | Fluoran-thene | Pyrene | Benzo[a] anthracene | Chrysene | Benzo [b] fluoran-thene | Benzo [k] fluoran-thene | Benzo [a] pyrene | Dibenzo [a, h] anthra-cene | Benzo [g, h, i] pyrene | Total PAHs |
|---|---|---|---|---|---|---|---|---|---|---|---|---|---|
| Initial concentration in soil | 1.68 | 34.13 | 1.88 | 61.51 | 89.99 | 29.82 | 23.44 | 25.86 | 13.64 | 33.32 | 2.12 | 27.09 | 344.48 |
| The control with no plants | 0.28 | 14.23 | 0.45 | 33.14 | 57.28 | 18.14 | 14.66 | 14.37 | 7.22 | 21.42 | 0.98 | 15.17 | 197.34 |
| Planting alfalfa alone | 0.15 | 12.91 | 0.26 | 21.93 | 41.44 | 12.96 | 7.82 | 9.86 | 4.23 | 15.36 | 0.33 | 10.05 | 137.28 |
| Adding MWCNT (0.05 mg/g) + planting alfalfa | 0.01 | 0.18 | 0.00 | 0.27 | 0.85 | 0.31 | 0.29 | 0.18 | 0.09 | 0.23 | 0.04 | 0.85 | 3.29 |
| Contamination risk screening value for soil in construction land (first-class land) | | | | | | 5.5 | 490 | 5.5 | 55 | 0.55 | 0.55 | | |

What is claimed is:

1. A nanobioremediation method for contaminated soil in a high-concentration polycyclic aromatic hydrocarbon (PAH)-contaminated site, the method comprising:
    adding a carbon nanomaterial and a base fertilizer to the soil in the high-concentration PAH-contaminated site;
    evenly broadcast sowing alfalfa seeds to the contaminated soil, and keeping a soil moisture content at 60% of a field moisture capacity; and
    when the alfalfa seeds grow to a flowering or maturity stage, harvesting and removing plants from the contaminated soil.

2. The nanobioremediation method for soil in the high-concentration PAH-contaminated site according to claim 1, wherein the carbon nanomaterial comprises at least one of a single-walled carbon nanotube (SWCNT), a multi-walled carbon nanotube (MWCNT) or sulfonated graphene.

3. The nanobioremediation method for soil in the high-concentration PAH-contaminated site according to claim 2, wherein the sulfonated graphene is added at an amount of 0.2 mg/g, the SWCNT is added at an amount of 0.05 mg/g, and the MWCNT is added at an amount 0.05 mg/g.

4. The nanobioremediation method for soil in the high-concentration PAH-contaminated site according to claim 1, wherein the base fertilizer comprises urea, $Ca(H_2PO_4)_2 \cdot H_2O$ and $K_2SO_4$.

5. The nanobioremediation method for soil in the high-concentration PAH-contaminated site according to claim 4, wherein the base fertilizer is added at an amount as follows: 0.215 g of urea, 0.285 g of $Ca(H_2PO_4)_2 \cdot H_2O$ and 0.188 g of $K_2SO_4$ per kilogram of soil.

* * * * *